US010311860B2

(12) United States Patent
Aleksic et al.

(10) Patent No.: US 10,311,860 B2
(45) Date of Patent: Jun. 4, 2019

(54) LANGUAGE MODEL BIASING SYSTEM

(71) Applicant: Google LLC, Mountain View, CA (US)

(72) Inventors: Petar Aleksic, Jersey City, NJ (US); Pedro J. Moreno Mengibar, Jersey City, NJ (US)

(73) Assignee: Google LLC, Mountain View, CA (US)

( * ) Notice: Subject to any disclaimer, the term of this patent is extended or adjusted under 35 U.S.C. 154(b) by 122 days.

(21) Appl. No.: 15/432,620

(22) Filed: Feb. 14, 2017

(65) Prior Publication Data
US 2018/0233131 A1    Aug. 16, 2018

(51) Int. Cl.
| | |
|---|---|
| *G10L 15/00* | (2013.01) |
| *G10L 15/07* | (2013.01) |
| *G10L 15/187* | (2013.01) |
| *G10L 15/18* | (2013.01) |
| *G10L 15/197* | (2013.01) |
| G10L 15/30 | (2013.01) |
| G10L 15/01 | (2013.01) |

(52) U.S. Cl.
CPC ........... *G10L 15/07* (2013.01); *G10L 15/187* (2013.01); *G10L 15/1815* (2013.01); *G10L 15/197* (2013.01); *G10L 15/01* (2013.01); *G10L 15/30* (2013.01)

(58) Field of Classification Search
CPC ..... G10L 15/197; G10L 15/183; G10L 15/07; G10L 15/24; G10L 15/065; G10L 15/22; G10L 15/26; G10L 15/083; G10L 15/10; G10L 15/142; G10L 15/16; G10L 15/187; G10L 21/10; G06F 17/2785; G06F 17/278; G06F 17/2715; G06F 17/277; G06N 3/02

USPC .................... 704/231, 246, 256.4
See application file for complete search history.

(56) References Cited

U.S. PATENT DOCUMENTS

| | | |
|---|---|---|
| 4,820,059 A | 4/1989 | Miller et al. |
| 5,267,345 A | 11/1993 | Brown et al. |

(Continued)

FOREIGN PATENT DOCUMENTS

| | | |
|---|---|---|
| DE | 100 45 020 | 5/2001 |
| EP | 1067470 | 1/2001 |

(Continued)

OTHER PUBLICATIONS

U.S. Appl. No. 95/001,073, filed Sep. 30, 2004, Reexamination of Stone, et al.

(Continued)

*Primary Examiner* — Vijay B Chawan
(74) *Attorney, Agent, or Firm* — Fish & Richardson P.C.

(57) ABSTRACT

Methods, systems, and apparatus for receiving audio data corresponding to a user utterance and context data, identifying an initial set of one or more n-grams from the context data, generating an expanded set of one or more n-grams based on the initial set of n-grams, adjusting a language model based at least on the expanded set of n-grams, determining one or more speech recognition candidates for at least a portion of the user utterance using the adjusted language model, adjusting a score for a particular speech recognition candidate determined to be included in the expanded set of n-grams, determining a transcription of user utterance that includes at least one of the one or more speech recognition candidates, and providing the transcription of the user utterance for output.

20 Claims, 4 Drawing Sheets

(56) References Cited

U.S. PATENT DOCUMENTS

| | | | |
|---|---|---|---|
| 5,632,002 A | 5/1997 | Hashimoto et al. | |
| 5,638,487 A | 6/1997 | Chigier | |
| 5,710,866 A * | 1/1998 | Alleva | G10L 15/10 |
| | | | 704/246 |
| 5,715,367 A | 2/1998 | Gillick et al. | |
| 5,737,724 A | 4/1998 | Atal et al. | |
| 5,768,603 A | 6/1998 | Brown et al. | |
| 5,805,832 A | 9/1998 | Brown et al. | |
| 5,819,220 A * | 10/1998 | Sarukkai | H04M 3/493 |
| | | | 704/270.1 |
| 5,822,730 A | 10/1998 | Roth et al. | |
| 6,021,403 A | 2/2000 | Horvitz et al. | |
| 6,119,186 A | 9/2000 | Watts et al. | |
| 6,167,377 A | 12/2000 | Gillick et al. | |
| 6,173,261 B1 | 1/2001 | Arai et al. | |
| 6,182,038 B1 | 1/2001 | Balakrishnan et al. | |
| 6,317,712 B1 | 11/2001 | Kao et al. | |
| 6,397,180 B1 | 5/2002 | Jaramillo et al. | |
| 6,418,431 B1 | 7/2002 | Mahajan et al. | |
| 6,446,041 B1 | 9/2002 | Reynar et al. | |
| 6,539,358 B1 | 3/2003 | Coon et al. | |
| 6,574,597 B1 | 6/2003 | Mohri et al. | |
| 6,581,033 B1 | 6/2003 | Reynar et al. | |
| 6,678,415 B1 | 1/2004 | Popat et al. | |
| 6,714,778 B2 | 3/2004 | Nykänen et al. | |
| 6,754,626 B2 | 6/2004 | Epstein | |
| 6,778,959 B1 | 8/2004 | Wu et al. | |
| 6,839,670 B1 | 1/2005 | Stammler et al. | |
| 6,839,671 B2 | 1/2005 | Attwater et al. | |
| 6,876,966 B1 | 4/2005 | Deng et al. | |
| 6,901,364 B2 | 5/2005 | Nguyen et al. | |
| 6,912,499 B1 | 6/2005 | Sabourin et al. | |
| 6,922,669 B2 | 7/2005 | Schalk et al. | |
| 6,950,796 B2 | 9/2005 | Ma et al. | |
| 6,959,276 B2 | 10/2005 | Droppo et al. | |
| 6,993,615 B2 | 1/2006 | Falcon | |
| 6,999,925 B2 | 2/2006 | Fischer et al. | |
| 6,999,931 B2 | 2/2006 | Zhou | |
| 7,027,987 B1 | 4/2006 | Franz et al. | |
| 7,043,422 B2 | 5/2006 | Gao et al. | |
| 7,058,573 B1 | 6/2006 | Murveit et al. | |
| 7,072,838 B1 | 7/2006 | Ghosh et al. | |
| 7,143,035 B2 | 11/2006 | Dharanipragada et al. | |
| 7,146,323 B2 | 12/2006 | Guenther et al. | |
| 7,149,688 B2 | 12/2006 | Schalkwyk | |
| 7,149,970 B1 | 12/2006 | Pratley et al. | |
| 7,174,288 B2 | 2/2007 | Ju et al. | |
| 7,181,387 B2 | 2/2007 | Ju et al. | |
| 7,184,957 B2 | 2/2007 | Brookes et al. | |
| 7,200,550 B2 | 4/2007 | Menezes et al. | |
| 7,224,981 B2 | 5/2007 | Deisher et al. | |
| 7,225,130 B2 | 5/2007 | Roth et al. | |
| 7,257,532 B2 | 8/2007 | Toyama | |
| 7,302,391 B2 | 11/2007 | Reding et al. | |
| 7,310,601 B2 | 12/2007 | Nishizaki et al. | |
| 7,366,668 B1 | 4/2008 | Franz et al. | |
| 7,370,275 B2 | 5/2008 | Haluptzok et al. | |
| 7,379,949 B2 | 5/2008 | Chowdhury | |
| 7,383,553 B2 | 6/2008 | Atkin et al. | |
| 7,392,174 B2 | 6/2008 | Freeman | |
| 7,392,188 B2 | 6/2008 | Junkawitsch et al. | |
| 7,400,878 B2 | 7/2008 | Hassan et al. | |
| 7,403,888 B1 | 7/2008 | Wang et al. | |
| 7,403,890 B2 | 7/2008 | Roushar | |
| 7,424,426 B2 | 9/2008 | Furui et al. | |
| 7,424,428 B2 | 9/2008 | Rose et al. | |
| 7,451,085 B2 | 11/2008 | Rose et al. | |
| 7,457,745 B2 | 11/2008 | Kadambe et al. | |
| 7,505,894 B2 | 3/2009 | Menezes et al. | |
| 7,516,177 B2 | 4/2009 | Knapp et al. | |
| 7,526,431 B2 | 4/2009 | Roth et al. | |
| 7,533,020 B2 | 5/2009 | Arnold et al. | |
| 7,542,907 B2 | 6/2009 | Epstein et al. | |
| 7,546,529 B2 | 6/2009 | Reynar et al. | |
| 7,570,943 B2 | 8/2009 | Sorvari et al. | |
| 7,577,562 B2 | 8/2009 | Menezes et al. | |
| 7,580,363 B2 | 8/2009 | Sorvari et al. | |
| 7,587,321 B2 * | 9/2009 | Liu | G10L 15/187 |
| | | | 704/256.3 |
| 7,599,851 B2 | 10/2009 | Frengut et al. | |
| 7,634,095 B2 | 12/2009 | Arun | |
| 7,634,720 B2 | 12/2009 | Haluptzok et al. | |
| 7,672,833 B2 | 3/2010 | Blume et al. | |
| 7,684,985 B2 | 3/2010 | Dominach et al. | |
| 7,693,827 B2 | 4/2010 | Zamir et al. | |
| 7,698,124 B2 | 4/2010 | Menezes et al. | |
| 7,698,136 B1 | 4/2010 | Nguyen et al. | |
| 7,716,161 B2 | 5/2010 | Dean et al. | |
| 7,720,044 B1 | 5/2010 | Rainisto | |
| 7,739,286 B2 | 6/2010 | Sethy et al. | |
| 7,747,437 B2 * | 6/2010 | Verhasselt | G10L 15/19 |
| | | | 704/252 |
| 7,752,046 B2 | 7/2010 | Bacchiani et al. | |
| 7,778,816 B2 | 8/2010 | Reynar | |
| 7,805,299 B2 | 9/2010 | Coifman | |
| 7,831,427 B2 | 11/2010 | Potter et al. | |
| 7,848,927 B2 | 12/2010 | Ohno et al. | |
| 7,877,258 B1 * | 1/2011 | Chelba | G06F 17/2715 |
| | | | 704/240 |
| 7,881,936 B2 | 2/2011 | Longé et al. | |
| 7,890,326 B2 | 2/2011 | Strope et al. | |
| 7,907,705 B1 | 3/2011 | Huff et al. | |
| 7,941,189 B2 | 5/2011 | Miyauchi | |
| 7,953,692 B2 | 5/2011 | Bower et al. | |
| 7,983,902 B2 | 7/2011 | Wu et al. | |
| 7,996,220 B2 | 8/2011 | Rose et al. | |
| 7,996,224 B2 | 8/2011 | Bacchiani et al. | |
| 8,001,130 B2 | 8/2011 | Wen et al. | |
| 8,005,680 B2 | 8/2011 | Kommer | |
| 8,009,678 B2 | 8/2011 | Brooke | |
| 8,023,636 B2 | 9/2011 | Koehler et al. | |
| 8,027,973 B2 | 9/2011 | Cao et al. | |
| 8,041,566 B2 | 10/2011 | Peters et al. | |
| 8,041,568 B2 | 10/2011 | Strope et al. | |
| 8,060,369 B2 | 11/2011 | Bangalore et al. | |
| 8,060,373 B2 | 11/2011 | Gibbon et al. | |
| 8,069,027 B2 | 11/2011 | Liu et al. | |
| 8,069,043 B2 | 11/2011 | Bacchiani et al. | |
| 8,073,681 B2 | 12/2011 | Baldwin et al. | |
| 8,082,143 B2 | 12/2011 | Menezes et al. | |
| 8,090,738 B2 | 1/2012 | Paek et al. | |
| 8,121,837 B2 | 2/2012 | Agapi et al. | |
| 8,175,878 B1 * | 5/2012 | Chelba | G06F 17/2715 |
| | | | 704/240 |
| 8,219,384 B2 | 7/2012 | Lloyd et al. | |
| 8,255,217 B2 | 8/2012 | Stent et al. | |
| 8,265,928 B2 | 9/2012 | Kristhansson et al. | |
| 8,321,219 B2 | 11/2012 | Mozer | |
| 8,352,245 B1 | 1/2013 | Lloyd | |
| 8,352,246 B1 | 1/2013 | Lloyd | |
| 8,352,321 B2 | 1/2013 | Mei et al. | |
| 8,355,915 B2 | 1/2013 | Rao | |
| 8,364,481 B2 | 1/2013 | Strope et al. | |
| 8,364,612 B2 | 1/2013 | Van Gael et al. | |
| 8,396,713 B2 | 3/2013 | Goel et al. | |
| 8,407,236 B2 | 3/2013 | Chen et al. | |
| 8,423,362 B2 | 4/2013 | Chengalvarayan et al. | |
| 8,468,012 B2 | 6/2013 | Lloyd et al. | |
| 8,473,276 B2 | 6/2013 | Qian et al. | |
| 8,509,398 B2 | 8/2013 | Kriese et al. | |
| 8,589,163 B2 | 11/2013 | Ljolje et al. | |
| 8,606,581 B1 | 12/2013 | Quast et al. | |
| 8,611,505 B2 | 12/2013 | Oppenheim et al. | |
| 8,694,313 B2 | 4/2014 | Lloyd et al. | |
| 8,700,392 B1 | 4/2014 | Hart et al. | |
| 8,719,017 B2 | 5/2014 | Rose et al. | |
| 8,751,217 B2 | 6/2014 | Ballinger et al. | |
| 8,762,143 B2 | 6/2014 | Gilbert | |
| 8,775,177 B1 | 7/2014 | Heigold et al. | |
| 8,795,177 B2 | 8/2014 | Goode, Jr. et al. | |
| 8,838,457 B2 | 9/2014 | Cerra et al. | |
| 8,918,317 B2 | 12/2014 | Fritsch et al. | |
| 8,938,688 B2 | 1/2015 | Bradford et al. | |
| 8,977,548 B2 | 3/2015 | Shostak | |

(56) References Cited

U.S. PATENT DOCUMENTS

| | | | |
|---|---|---|---|
| 8,996,368 | B2 | 3/2015 | Willett |
| 9,031,830 | B2 | 5/2015 | Ballinger et al. |
| 9,043,205 | B2 | 5/2015 | Mengibar et al. |
| 9,043,209 | B2 | 5/2015 | Yamamoto et al. |
| 9,047,868 | B1 | 6/2015 | O'Neill et al. |
| 9,047,870 | B2* | 6/2015 | Ballinger ............... G10L 15/30 |
| 9,076,445 | B1 | 7/2015 | Lloyd |
| 9,117,450 | B2 | 8/2015 | Cook et al. |
| 9,128,926 | B2 | 9/2015 | Waibel |
| 9,153,231 | B1* | 10/2015 | Salvador ............... G10L 15/065 |
| 9,251,791 | B2 | 2/2016 | Ballinger et al. |
| 9,460,713 | B1* | 10/2016 | Moreno Mengibar ................ G10L 15/197 |
| 9,495,127 | B2 | 11/2016 | Ballinger et al. |
| 9,502,032 | B2* | 11/2016 | Aleksic ............... G10L 15/22 |
| 9,542,945 | B2 | 1/2017 | Lloyd |
| 9,576,578 | B1* | 2/2017 | Skobeltsyn ............ G10L 15/26 |
| 9,691,384 | B1* | 6/2017 | Wang .................. G10L 15/22 |
| 9,704,483 | B2* | 7/2017 | Sharifi ............... G10L 15/197 |
| 9,886,946 | B2* | 2/2018 | Moreno-Mengibar ................ G10L 15/197 |
| 9,978,367 | B2* | 5/2018 | Aleksic ............... G10L 15/26 |
| 2002/0087309 | A1 | 7/2002 | Lee et al. |
| 2002/0111990 | A1 | 8/2002 | Wood et al. |
| 2004/0138882 | A1 | 7/2004 | Miyazawa |
| 2004/0243415 | A1 | 12/2004 | Commarford et al. |
| 2005/0108017 | A1 | 5/2005 | Esser et al. |
| 2005/0114474 | A1 | 5/2005 | Anderson et al. |
| 2005/0137868 | A1* | 6/2005 | Epstein ............... G10L 15/183 704/252 |
| 2005/0246325 | A1 | 11/2005 | Pettinati et al. |
| 2006/0009974 | A1 | 1/2006 | Junqua et al. |
| 2007/0060114 | A1 | 3/2007 | Ramer et al. |
| 2008/0027723 | A1 | 1/2008 | Reding et al. |
| 2008/0131851 | A1 | 6/2008 | Kanevsky et al. |
| 2008/0221902 | A1 | 9/2008 | Cerra et al. |
| 2009/0030687 | A1 | 1/2009 | Cerra et al. |
| 2010/0100377 | A1 | 4/2010 | Madhavapeddi et al. |
| 2010/0179803 | A1 | 7/2010 | Sawaf et al. |
| 2010/0318531 | A1 | 12/2010 | Gao et al. |
| 2010/0325109 | A1 | 12/2010 | Bai et al. |
| 2011/0004462 | A1 | 1/2011 | Houghton et al. |
| 2011/0060587 | A1 | 3/2011 | Phillips et al. |
| 2011/0077943 | A1 | 3/2011 | Miki et al. |
| 2011/0161080 | A1 | 6/2011 | Ballinger et al. |
| 2011/0161081 | A1 | 6/2011 | Ballinger et al. |
| 2011/0162035 | A1 | 6/2011 | King et al. |
| 2012/0016671 | A1* | 1/2012 | Jaggi ................... G10L 15/22 704/235 |
| 2012/0022783 | A1 | 1/2012 | Ballinger et al. |
| 2012/0022866 | A1 | 1/2012 | Ballinger et al. |
| 2012/0191449 | A1* | 7/2012 | Lloyd ................... H04M 1/04 704/231 |
| 2013/0297313 | A1 | 11/2013 | Lloyd et al. |
| 2013/0346078 | A1 | 12/2013 | Gruenstein et al. |
| 2014/0244259 | A1* | 8/2014 | Rosario ................ G10L 15/19 704/254 |
| 2015/0228279 | A1* | 8/2015 | Biadsy ................. G10L 15/26 704/235 |
| 2016/0132293 | A1 | 5/2016 | Ballinger et al. |
| 2016/0275946 | A1* | 9/2016 | Caseiro ............... G06F 17/2715 |
| 2016/0293163 | A1* | 10/2016 | Moreno Mengibar ................ G10L 15/197 |
| 2017/0270918 | A1* | 9/2017 | Moreno Mengibar ................ G10L 15/197 |
| 2017/0270929 | A1* | 9/2017 | Aleksic ............... G10L 15/26 |
| 2018/0144741 | A1* | 5/2018 | Moreno Mengibar ................ G10L 15/197 |

FOREIGN PATENT DOCUMENTS

| | | |
|---|---|---|
| EP | 1180873 | 2/2002 |
| EP | 1355448 | 10/2003 |
| JP | 2003-067630 | 3/2003 |
| JP | 2003-067652 | 3/2003 |
| JP | 2003-150841 | 5/2003 |
| JP | 2004-070884 | 3/2004 |
| JP | 2004-102470 | 4/2004 |
| JP | 2004-185389 | 7/2004 |
| WO | WO 1997/021183 | 6/1997 |
| WO | WO 2001/037517 | 5/2001 |
| WO | WO 2002/096070 | 11/2002 |
| WO | WO 2004/054299 | 6/2004 |
| WO | WO 2005/122143 | 12/2005 |
| WO | WO 2008/030976 | 3/2008 |
| WO | WO 2004/029758 | 4/2008 |

OTHER PUBLICATIONS

U.S. Appl. No. 95/001,069, filed Jul. 11, 2002, Reexamination of Stone, et al.

U.S. Appl. No. 95/001,068, filed Dec. 7, 2002, Reexamination of Stone, et al.

U.S. Appl. No. 95/001,061, filed Sep. 3, 2002, Reexamination of Stone, et al.

www.blog.greggman.com [online] "Japanese Input on Windows XP," Apr. 29, 2004, Retrieved from Internet: Url<http://blog.greggman.com/blog/japanese_input_on_windows_xp> 11 pages.

"JiWire Mobile Broadband Advertising for Municipal Networks", Information on Advertising Subsidized Municipal Networks. JiWire website. [online]. [retrieved on Jul. 17, 2010]. Retrieved from the Internet: <URL: www.jiwire.com>, 2 pages.

"Wi-Fi Hotspot Finder, Product Review, and Industry News", Hotspot Availability and Sponsors, JiWire website [online]. Sep. 10, 2004. [retrieved on Jan. 7, 2008]. Retrieved from the Internet: <URL: http://web.archive.org/web/20040910001718/http://www.jiwire.com/>, 2 pages.

AdForce, Inc., "User Guide to AdForce, Version 2.6," 1998, 285 pages.

AdForce, Inc., "S-1/A SEC Filing," May 6, 1999, 9 pages.

"AdKnowledge Campaign Manager Reviewer's Guide", Adknowledge, Aug. 1998, 23 pages.

"AdKnowledge Market Match Planner: Reviewer's Guide," AdKnowledge, May 1998, 26 pages.

Ad-Star.com [online] "Appendix C: About Ad-Star," Apr. 12, 1997, Retrieved from Internet URL<http://web.archive.org/web/19970412171433/www.adstar.com/about.html> 43 pages.

Baseview Products, Inc., "AdManagerPro Administration Manual v 2.0", Dec. 1998, 226 pages.

Baseview Products, Inc., "ClassManagerPro Administration Manual v. 1.0.5," Feb. 1, 1997, 157 pages.

Bocchieri et al., "Use of geographical meta-data in ASR language and acoustic models", Acoustics Speech and Signal Processing (ICASSP), 2010 IEEE International Conference on IEEE, Mar. 14, 2010, 4 pages.

Buchsbaum et al. "Algorithmic aspects in speech recognition: An introduction." Journal of Experimental Algorithmics: 2, Jan. 1, 1997, 44 pages.

Business Wire, "Global Network, Inc. Enters into Agreement in Principle with Major Advertising Agency," Oct. 4, 1999, 2 pages.

Cao et al. "Context-aware query suggestion by mining click-through and session data," in Proceedings of the 14th ACM SIGKDD International Conference on Knowledge Discovery and Data Mining (KDD '08), ACM, 2008, 875-883.

Chang et al. "A system for spoken query information retrieval on mobile devices." Speech and Audio Processing, IEEE Transactions on 10.8 Nov. 2002, 11 pages.

Dedrick. "A Consumption Model for Targeting Electronic Advertising," Intel Architecture Labs, IEEE, 1995.

Dedrick "Interactive Electronic Advertising," Community Networking Integrated Multimedia Services to the Home, IEEE, Jul. 13, 1994, 12 pages.

Dhillon. "Co-clustering documents and words using bipartite spectral graph partitioning:" in Proceedings of the Seventh ACM SIGKDD International Conference on Knowledge Discovery and Data Mining, (KDD '01), ACM, New York, NY, 2001, 269-274.

(56) References Cited

OTHER PUBLICATIONS

Frey et al. "ALGONQUIN: Iterating Laplace's Method to Remove Multiple Types of Acoustic Distortion for Robust Speech Recognition", Eurospeech 2001 Scandinavia, 7th European Conference on Speech Communication and Technology, Aalborg, Denmark, Sep. 3-7, 2001, 4 pages.

Information Access Technologies, Inc., Aaddzz brochure, "The Best Way to Buy and Sell Web Advertising Space," © 1997, 6 pages.

wwwAaddzz.com [online] "The Maximum Performance Ad Network," Information Access Technologies, Inc.,archives on Jan. 30, 1998, Retrieved from Internet URL<http://web.archive.org/web/19980130092746/www.aaddzz.com/pp./b-highlights, 42 pages.

Kristjansson et al. "Super-Human Multi-Talker Speech Recognition: The IBM 2006 Speech Separation Challenge System", Interspeech 2006: ICSLP; Proceedings of the Ninth International Conference on Spoken Language Process, Sep. 17-21, 2006, Pittsburgh, Pennsylvania, USA, Bonn, ISCA, 2006, 4 pages.

Kurland. Re-ranking search results using language models of query-specific clusters, ACM, 2009, 12(4) 24 pages.

Lee et al. "Search Result Clustering Using Label Language Model," IJCNLP 2008, The Third International Joint Conference on Natural Language Processing, Jan. 7-12, 2008, Hyderabad, India, 6 pages.

Li et al. "Query-URL Bipartite Based Approach to Personalized Query Recommendation," Proceedings of the Twenty Third AAAI Conference on Artificial Intelligence, 2008, 6 pages.

Liu and Croft. "Cluster-based retrieval using language models:" in Proceedings of the 27th Annual International ACM SIGIR Conference on Research and Development in Information Retrieval, (SIGIR '04). ACM, New York, NY, 2004, 186-193.

Maguitman et al. "Algorithmic detection of semantic similarity," in Proceedings of the 14th International Conference on World Wide Web (WWW '05), ACM, 2005, 10 pages.

Mohri et al. "Weighted Finite-State Transducers in Speech Recognition," Computer Speech & Language, 2002, 16(1) 27 pages.

Perkins, Charles E., "Mobile Networking through Mobile IP," IEEE Internet Computing, Tutorial, Jan.-Feb. 1998, pp. 58-69.

Vertanen, Keith. "An Overview of Discriminative Training for Speech Recognition." Technical Report, 2004, from http://www.inference.phy.cam.ac.uk/kv227/papers/Discriminative_Training.pdf., 14 pages.

Xu et al. "Using social annotations to improve language model for information retrieval:" in Proceedings of the Sixteenth ACM Conference on Information and Knowledge Management, (CIKM '07). ACM, New York, NY, 2007, 4 pages.

Xu et al., "Cluster-based language models for distributed retrieval." Proceedings of the 22nd annual international ACM SIGIR conference on Research and development in information retrieval. ACM, Aug. 1999, 8 pages.

Yunos et al., "Wireless Advertising's Challenges and Opportunities," IEEE Computer Society, May 2003, 8 pages.

Zeff, R., et al., Advertising on the Internet, 2nd Ed., John Wiley & Sons, 1999, 440 pages.

Zha et al. "Bipartite graph partitioning and data clustering:" in Proceedings of the Tenth International Conference on Information and Knowledge Management (CIKM '01), Henrique Paques et al. (Eds.). 2001, ACM, New York, NY, 8 pages.

Zweig et al. "Structured Models for Joint Decoding of Repeated Utterances", Interspeech 2008, 9th Annual Conference of the International Speech Communication Association, Brisbane, Australia, Sep. 22-26, 2008, 4 pages.

Zweig, G., "New Methods for the Analysis of Repeated Utterances", INTERSPEECH 2009, 10th Annual Conference of the International Speech Communication Association, Brighton, United Kingdom, Sep. 6-10, 2009, 4 pages.

Aleksic et al. "Bringing Contextual Information to Google Speech Recognition," Interspeech, Sep. 6, 2015, 5 pages.

Halpern et al. "Contextual Prediction Models for Speech Recognition," Interspeech vol. 2016, Sep. 8, 2016, 5 pages.

International Search Report and Written Opinion issued in International Application No. PCT/US2017/057369, dated Mar. 1, 2018, 14 pages.

\* cited by examiner

LANGUAGE MODEL BIASING SYSTEM

TECHNICAL FIELD

This specification relates to speech recognition, and one particular implementation relates to biasing language models used in performing speech recognition.

BACKGROUND

Speech inputs are often used to perform various operations on an electronic device. For example, some mobile telephones or other computing devices allow users to provide voice commands or to provide other speech inputs to perform operations, indicate user selections, launch applications, or initiate communications using the mobile telephone. A speech input of a user can be detected by a microphone of a computing device and processed by an automated speech recognizer.

An automated speech recognizer may use an acoustic model and a language model to perform speech recognition. The automated speech recognizer may use the acoustic model to determine relationships between an audio signal and phonetic units in the language of the user. The language model indicates likely phonetic or word sequences for the language of the user. Using these two models, the automated speech recognizer may generate candidate transcriptions of a speech input.

SUMMARY

This specification describes a system that can improve the accuracy of speech recognition by biasing a language model that is used by an automated speech recognizer. In some implementations, the system biases a general language model based on context information. The context information may include, for example, one or more n-grams (e.g., n-grams of words, such as individual words or phrases including multiple words) that are received by the system. The system may submit these n-grams to one or more language expansion services, and in response receive additional n-grams that are identified by the language expansion services. The general language model may be biased based on the n-grams included in the context information and the n-grams received from the language expansion services. An automated speech recognizer can use the biased general language model to perform speech recognition. Biasing the language model in this manner can dynamically tune the model to favor words that are relevant to the user's current task or situation, allowing the system to more accurately transcribe speech, especially for words that are uncommon in typical speech.

For example, a developer of an application configured to respond to speech inputs can provide the system with a list of words and/or phrases associated with the application. The list may include words that a user is likely to speak when the application is in a particular state, for example, at a particular menu screen. The system can receive the list of words as an initial set of n-grams, and can submit the initial set of n-grams to various language expansion services. The language expansion services can generate other n-grams based on the initial set of n-grams, which the system can collect as an expanded set of n-grams. The system can bias a general language model based on the initial set of n-grams and/or the expanded set of n-grams. The biased general language model can be used by an automated speech recognizer to generate a transcription of a speech input provided by a user.

After the speech recognizer uses the biased general language model to perform speech recognition on a speech input, preferences for speech recognition candidates generated by the speech recognizer can be adjusted based on the identified n-grams. For instance, probabilities, recognition scores, or probability masses assigned to speech recognition candidates that include identified n-grams can be adjusted to increase a preference for those speech recognition candidates. After making these adjustments, the speech recognizer can determine a transcription for the speech input that includes one or more of the speech recognition candidates.

In some implementations, the general language model may be biased for a user's current context before a speech input is received from the user. In other implementations, the system can update the biasing of the general language model as a user provides speech input, e.g., periodically as the automated speech recognizer processes audio data corresponding to the speech input. For example, as words are detected in the speech input, the system can submit those words to the language expansion services to obtain expanded sets of n-grams that are used to bias the general language model.

Biasing a general language model allows for more accurate and efficient speech recognition than can be achieved through other methods of language model biasing. For example, biasing a single, general language model may be more efficient in terms of processing requirements and storage space than interpolating a general language model with one or more context-specific language models. Biasing a general language model, as opposed to selecting context-specific language models or interpolating general and context-specific language models, also allows an automated speech recognizer to use language models that are biased using a more specific context, and biased more frequently as a context develops, thereby enhancing speech recognition accuracy. Additionally, the same information used in biasing the general language model can be used to identify preferred speech recognition candidates generated using the biased general language model. This second form of biasing, of the speech recognition candidates, can further enhance speech recognition accuracy.

Innovative aspects of the subject matter described in this specification may be embodied in methods that include the actions of receiving audio data corresponding to a user utterance and context data for the user utterance, identifying an initial set of one or more n-grams from the context data, generating an expanded set of one or more n-grams based at least on the initial set of n-grams, the expanded set of n-grams comprising one or more n-grams that are different from the n-grams in the initial set of n-grams, adjusting a language model based at least on the expanded set of n-grams, determining one or more speech recognition candidates for at least a portion of the user utterance using the adjusted language model, wherein each speech recognition candidate comprises one or more words, after determining the one or more speech recognition candidates, adjusting a score for a particular speech recognition candidate determined to be included in the expanded set of n-grams, after adjusting the score for the particular speech recognition candidate, determining, a transcription for the user utterance that includes at least one of the one or more speech recognition candidates, and providing the transcription of the user utterance for output.

These and other embodiments may each optionally include one or more of the following features. In various examples, adjusting the language model based at least on the expanded set of n-grams comprises adjusting recognition scores for one or more of the n-grams of the expanded set of n-grams in the language model; adjusting the language model based at least on the expanded set of n-grams comprises adjusting probability masses assigned to one or more n-grams of the expanded set of n-grams in the language model.

Embodiments may also each include one or more of the following optional features. In various examples, adjusting the language model based at least on the expanded set of n-grams comprises adding one or more n-grams of the expanded set of n-grams to the language model; the language model includes one or more placeholder transitions, and adding the one or more n-grams of the expanded set of n-grams to the language model comprises assigning a particular n-gram of the expanded set of n-grams to a particular placeholder transition; assigning the particular n-gram of the expanded set of n-grams to the particular placeholder transition comprises adjusting a recognition score for the particular placeholder transition that is assigned the particular n-gram of the expanded set of n-grams.

Embodiments may also each include one or more of the following optional features. In some examples, generating the expanded set of n-grams based at least on the initial set of n-grams comprises sending one or more of the initial set of n-grams to each of one or more language expansion services, and receiving, from the one or more language expansion services and in response to sending the one or more of the initial set of n-grams to each of the one or more language expansion services, the expanded set of one or more n-grams; one or more of the expanded set of n-grams are included in a hash map, and adjusting the score for the particular speech recognition candidate determined to be included in the expanded set of n-grams comprises determining that the particular speech recognition candidate is included in the hash map; the audio data corresponding to the user utterance corresponds to a frame of a spoken user input that comprises multiple frames; the language model is a general language model or a general language model that has been influenced during processing of a preceding frame of the spoken user input.

Embodiments may also each include one or more of the following optional features. In some instances, the context data comprises one or more context words; the one or more context words are each submitted by an application developer of an application that is configured to perform operations in response to spoken user inputs; the context data does not include one or more words included in a previous transcription of a user utterance; the language model is adjusted based at least on the expanded set of n-grams prior to receiving the audio data corresponding to the user utterance; the features may comprise adjusting the language model based at least on the initial set of n-grams.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference symbols in the various drawings indicate like elements.

DETAILED DESCRIPTION

Figure 1:
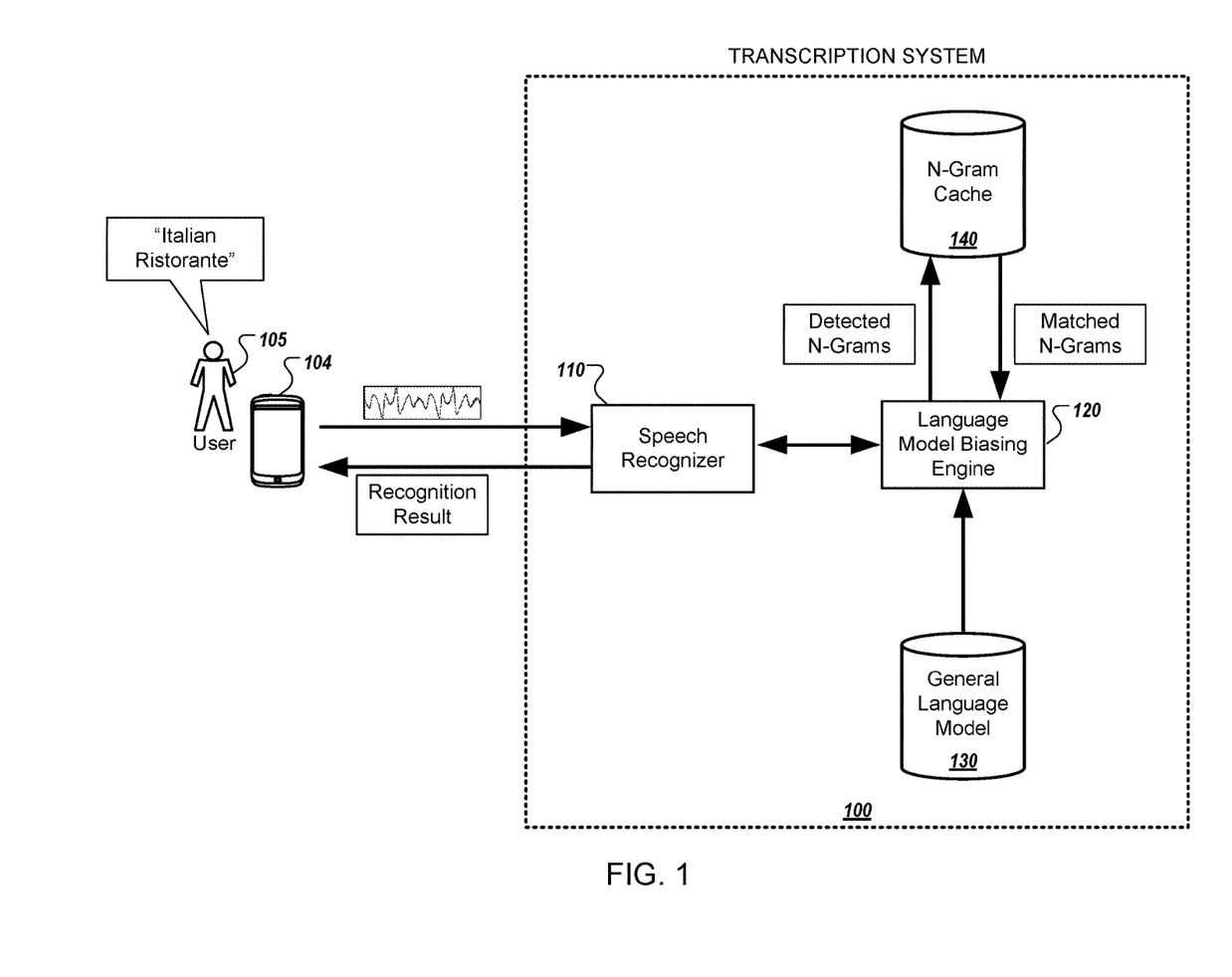
FIG. 1 depicts an example system for biasing a language model and performing speech recognition using the biased language model.

FIG. 1 depicts an example system for biasing a language model used by an automated speech recognizer and performing speech recognition using the biased language model. Briefly, FIG. 1 shows a user 105 having a client device 104 providing a speech input to the user device 104. The user device 104 interacts with a transcription system 100 to obtain a transcription of the speech input.

In some implementations, the transcription system 100 may be included in the user device 104, for example, as a software application stored and operating locally on the user device 104. In other implementations, the transcription system 100 may be accessible by the user device 104 over one or more wired or wireless data pathways. For example, the transcription system 100 may be hosted at a server accessible by the user device 104 over one or more networks, such as over a wired or wireless Internet connection.

The user device 104 may be any computing device capable of receiving speech inputs and performing operations in response to speech inputs. For example, the user device 104 may be a computing device configured with a microphone and one or more processors for processing operations triggered based on speech inputs received by the microphone. The user device 104 may be, for example, a cellular telephone, smartphone, personal digital assistant (PDA), smart watch, tablet computer, laptop computer, desktop computer, or other computing device. The user device 104 may include an interface for permitting user interactions with the user device 104, such as touchscreen, keypad, mouse, trackpad, display, or other interface that allows the user 105 to provide inputs to the user device 104 and/or for the user device 104 to present information to the user 105. The user device 104 may further include one or more wired or wireless network connections, for example, one or more cellular antennae, Wi-Fi, Bluetooth, Ethernet, Z-Wave, ZigBee, or other mechanisms for communicating data over wired or wireless connections, for example, to the transcription system 100.

The transcription system 100 includes a speech recognizer 110 for performing speech recognition, and a language model biasing engine 120 for biasing a language model used by the speech recognizer 110 in performing speech recognition. The transcription system 100 further includes a general language model 130 and an n-gram cache 140. The language model biasing engine 120 accesses the general language model 130 and biases the general language model 130 based on information received from the n-gram cache 140.

The speech recognizer 110 may have access to one or more acoustic models for processing audio data corresponding to speech inputs provided by the user 105. To perform speech recognition, the speech recognizer 110 also receives or accesses a language model from the language model biasing engine 120. The speech recognizer 110 processes audio data corresponding to a speech input using the one or more acoustic models and the language model received or accessible at the language model biasing engine 120 to generate a transcription of the speech input.

For example, the user 105 may provide the speech input "Italian Ristorante" to the user device 104, and the user device 104 may send audio data corresponding to the speech input to the transcription system 100. The speech recognizer 110 may process the audio data corresponding to the speech input "Italian Ristorante" using one or more acoustic models and the language model received or accessed at the language model biasing engine 120 to generate a transcription of the speech input.

The speech recognizer 110 can provide the transcription of the speech input to the user device 104. For example, where the transcription system 100 is remote from the user device 104, the speech recognizer 110 can provide the transcription of the speech input to the user device 104 over one or more wired or wireless data pathways, e.g., networks. The user device 104 may receive the transcription and may perform operations on or relating to the transcription. For example, the user device 104 or an application operating on the user device 104 may trigger one or more actions in response to the speech input based on the transcription, or may provide the transcription for output at a display of the user device 104.

For instance, the speech recognizer 110 may generate the transcription "Italian Ristorante" by processing the audio data received from the user device 104 using the one or more acoustic models and the language model accessed or received from the language model biasing engine 120. The speech recognizer 110 may provide the transcription "Italian Ristorante" to the user device 104, where the user device 104 or an application operating on the user device 104 may perform operations in response to receiving the transcription, may provide the transcription "Italian Ristorante" for output, or may otherwise respond to the speech input.

The language model accessed or received from the language model biasing engine 120 may be a general language model 130 that the language model biasing engine 120 has modified based on an initial set of n-grams and an expanded n-grams that is received from a set of language expansion services. These n-grams can represent n-grams that each include one or more words. The general language model 130 may be a probabilistic language model that is a probability distribution over sequences of n-grams.

The general language model 130 is a language model that is not specific to a particular context, for example, is a language model that has been trained over a broad range of speech data and is therefore not specific to particular speech context. While described predominantly in this specification as an n-gram language model, in other implementations, other forms of general language model 130 may be employed. For example, the general language model 130 may be a unigram language model, a continuous space language model, a positional language model, a log-linear language model, or another type of general language model.

The n-gram cache 140 stores a set of n-grams that may be used to bias the general language model 130. The n-grams included in the n-gram cache 140 are n-grams that have been identified as related to a current context. As discussed in more detail with respect to FIG. 2, the n-grams included in the n-gram cache 140 may include an initial set of n-grams identified from context information received by the transcription system 100 and may include an expanded set of n-grams that have been identified from the n-grams identified in the context information received by the transcription system 100. The identified n-grams can be added to the n-gram cache 140 that is accessible by the language model biasing engine 120.

In some implementations, n-grams may be included in the n-gram cache 140 in response to other information or events. For example, a context may be identified based on determining a location of the user device 104, a current time, day, or date, a movement of the user device 104, background noise included in the audio signal received from the user device 104, other information being displayed to the user 105 at the user device 104, etc. One or more n-grams may be identified as being related to the context, and may be included in the n-gram cache 140. When the context of the user device 104 changes, the contents of the n-gram cache 140 can be changed, for example, to remove n-grams previously included in the n-gram cache 140 and to add new n-grams.

In some implementations, the context includes words present on a screen of the user device. The initial set of n-grams can be words and phrases extracted from text visible on the screen of the user. As another example, the initial set of n-grams can be n-grams provided by an application running on the user device. For example, the application may have different dialog states, e.g., different view corresponding to different tasks or different steps in a task. Each dialog state, which may correspond to different interfaces or views of the application, may have a predetermined set of n-grams that are not shown on the screen, but are designated by the application developer. For example, one set of n-grams may be designated as relevant to a view for typing the body of an email message, a second set of n-grams may be designated for a view used for selecting a contact within the same application, and so on. Similarly, information indicating the context may be provided as an identifier, e.g., an application identifier and/or a dialog state identifier, that the speech recognition system can use to look up appropriate n-grams from a database or from another server system.

In some implementations, the language model biasing engine 120 may bias the general language model 130 based on n-grams included in the n-gram cache 140 prior to the transcription system 100 receiving audio data corresponding to speech input by the user 105. For example, before receiving audio data corresponding to the speech input "Italian Ristorante" from the user device 104, the language model biasing engine 120 may access the n-gram cache 140 and identify n-grams included in the n-gram cache 140. The language model biasing engine 120 may access the general language model 130 and bias the general language model 130 based on the n-grams included in the n-gram cache 140.

For example, the language model biasing engine 120 may bias the general language model 130 to indicate a preference for n-grams in the general language model 130 that are also included in the n-gram cache 140. For example, the general language model 130 may be a probabilistic language model in which each edge between nodes of the general language model 130 represents a word or phrase. The language model biasing engine 120 may bias the general language model 130 by increasing probabilities associated with n-grams in the general language model 130 that are also included in the n-gram cache 140. Increasing the probabilities associated with n-grams identified in the n-gram cache 140 may result in the speech recognizer 110 being more likely to identify those n-grams. In some implementations, the language model biasing engine 120 may also bias the general language model 130 by decreasing probabilities associated with n-grams that are not identified in the n-gram cache 140, such that the speech recognizer 110 using a biased version of the general language model 130 would be less likely to identify those n-grams in audio data corresponding to a speech input.

In other implementations, the language model biasing engine 120 may bias the general language model 130 using other techniques. The language model biasing engine 120 may bias the general language model 130 by adjusting recognition scores assigned to n-grams in the general language model 130. For example, the language model biasing engine 120 may increase recognition scores assigned to n-grams that are included in the n-gram cache 140, and optionally decrease recognition scores assigned to other n-grams that are not included in the n-gram cache 140.

In other implementations, the language model biasing engine 120 may bias the general language model 130 by adjusting probability masses assigned to n-grams included in the general language model 130. For example, the language model biasing engine 120 may increase probability masses assigned to n-grams that are included in both the general language model 130 and n-gram cache 140, and may optionally decrease the probabilities masses of one or more n-grams in the general language model 130 that are not also included in the n-gram cache 140.

In some implementations, the language model biasing system 120 receives the n-grams to bias in the general language model 130 directly from one or more sources other than the n-gram cache 140. For example, the language model biasing system 120 may receive or determine an initial set of n-grams from context information received by the transcription system 100. The language model biasing system 120 may also receive or determine an expanded set of n-grams that are generated based on the initial set of n-grams by one or more language expansion services. The language model biasing engine 120 may bias the general language model 130 based on the initial set of n-grams and the expanded set of n-grams before the audio data corresponding to the speech input "Italian Ristorante" is received by the transcription system 100.

Such biasing may include adjusting probabilities, recognition scores, or probability masses assigned to n-grams of the initial or expanded sets of n-grams in the general language model 130. In some implementations, the general language model may include one or more placeholder transitions, i.e., transitions that are not assigned particular n-grams or words and/or that are not assigned probabilities, recognition scores, or probability masses sufficient for the speech recognizer 110 to select the placeholder transitions when generating speech recognition candidates. In those implementations, biasing the general language model 130 may include assigning one or more n-grams of the initial or expanded sets to the placeholder transitions, adjusting probabilities, recognition scores, or probability masses assigned to those placeholder transitions, or both.

In some implementations, the transcription system 100 biases the general language model 130 during or after a user provides speech input. In some implementations, such biasing may be performed for each frame or segment of audio data corresponding to a speech input. For example, the user 105 may provide the speech input "Italian Ristorante" to the user device 104. The user device 104 may receive the speech input using a microphone of the user device 104, and may transmit audio data corresponding to the speech input to the transcription system 100.

The speech recognizer 110 of the transcription system 100 receives the audio data corresponding to the speech input, and performs speech recognition on the audio data or a frame of the audio data to generate one or more speech recognition candidates for the audio data or frame of the audio data. Each speech recognition candidate may be an n-gram detected by the speech recognizer 110 from the audio data or frame of the audio data. To generate the speech recognition candidates, the speech recognizer 110 may use a biased version of the general language model 130, for example, the version of the general language model 130 generated by biasing the general language model before the user 105 provided the speech input, or a version of the general language model 130 generated by biasing the general language model during processing of a preceding portion, e.g., frame, of the audio data corresponding to the speech input.

After generating the speech recognition candidates, the speech recognizer 110 may provide the speech recognition candidates to the language model biasing engine 120, or the language model biasing engine 120 may access the speech recognition candidates at the speech recognizer 110. The language model biasing engine 120 may then access the n-gram cache 140 to identify speech recognition candidates, i.e., n-grams detected from the audio data, that are included in the n-gram cache 140. For example, the language model biasing engine 120 may compare the speech recognition candidates to the n-grams included in the n-gram cache 140 and identify n-grams in the n-gram cache 140 that match speech recognition candidates. The language model biasing engine 120 or the speech recognizer 110 may adjust probabilities, recognition scores, or probability masses for speech recognition candidates that contain n-grams included in the n-gram cache 140. Additionally or alternatively, the language model biasing engine 120 may also further bias the general language model 130 to prefer n-grams in the general language model 130 that were identified based on the comparison of the speech recognition candidates and the n-grams in the n-gram cache 140.

For example, the speech recognizer 110 may perform speech recognition on a portion of the audio data corresponding to the speech input "Italian Ristorante," and determine that two speech recognition candidates for the portion of the audio data are "Italian" and "pull in." The language model biasing engine 120 may determine that the n-gram "Italian" is included in the n-gram cache 140, but that the n-gram "pull in" is not. In response to determining that the n-gram "Italian" matches an n-gram included in the n-gram cache 140, the language model biasing engine 120 may adjust a preference, e.g., a probability, recognition score, or probability mass, for the speech recognition candidate "Italian" to increase the likelihood that the speech recognition candidate "Italian" is selected as the transcription of the portion of the speech input.

Additionally or alternatively, the language model biasing engine 120 may access the general language model 130 and may adjust a probability, probability mass, or recognition score associated with the n-gram "Italian" in the general language model 130 to bias the general language model 130 to that n-gram. A similar biasing process may be performed on the general language model 130 when processing the portion of the audio data corresponding to the n-gram "Ristorante."

After further biasing the general language model 130, e.g., after receiving the audio data corresponding to the speech input of the user 105, the speech recognizer 110 can use the further biased version of the general language model 130 in generating a transcription of the speech input or portion of the speech input. For example, the speech recognizer 110 can process the portion or frame of the audio data corresponding to the "Italian" portion of the speech input received by the user device 104 using the further biased version of the general language model 130 to generate one or more new speech recognition candidates that reflect the further biasing of the general language model 130. For instance, the candidate transcription "Italian" may be associated with a higher probability, recognition score, or probability mass than it would otherwise if the general language model 130 had not been further biased towards the n-gram "Italian."

The speech recognizer 110 can select a particular one of the speech recognition candidates as a transcription of the speech input or portion of the speech input to return to the user device 104, or selected as a portion of the transcription of the speech input to be returned to the user device 104. The speech recognition candidate selected as the transcription or portion of the transcription of the speech input may be the speech recognition candidate, or where further biasing of the general language model 130 is performed, the new speech recognition candidate, that is identified by the speech recognizer 110 as having a highest probability of being correct, having a highest recognition score, or having a greatest probability mass.

When selecting a particular speech recognition candidate, the language model biasing engine 120 or speech recognizer 110 may compare the speech recognition candidates to n-grams in the n-gram cache 140, and adjust probabilities, recognition scores, or probability masses for speech recognition candidates that are also n-grams in the n-gram cache 140. For example, after biasing the general language model 130 and using the biased general language model 140 to perform speech recognition on the speech input, the n-grams "pull in" and "Italian" identified as speech recognition candidates may be compared to n-grams stored in the n-gram cache 140. Based on identifying the n-gram "Italian" in the n-gram cache 140, and not identifying the n-gram "pull in" in the n-gram cache 140, the language model biasing engine 120 or speech recognizer 110 can adjust a score, probability, or probability mass to indicate a preference for the speech recognition candidate "Italian." For example, a probability, probability mass, or recognition score assigned to the speech recognition candidate "Italian" may be increased, or a probability, probability mass, or recognition score assigned to the speech recognition candidate "pull in" may be reduced.

The speech recognizer 110 selects the speech recognition candidate assigned the probability, recognition score, or probability mass indicating a highest confidence of being correct, and provides that speech recognition candidate to the user device 104. For example, based on comparing the probability, probability mass, or recognition score for the speech recognition candidate "Italian" to the probability, probability mass, or recognition score for the speech recognition candidate "pull in," the speech recognizer 110 may identify "Italian" as the transcription of the portion of the speech input. The transcription system 100 may then perform a similar process for the portion of the audio data corresponding to the word "Ristorante." The speech recognizer 110 may return a transcription to the user device 104 as it processes each portion of the speech input, e.g., such that the transcription "Italian" is provided to the user device 104 as the transcription system 100 processes the portion of the speech input corresponding to the word "Ristorante," or the speech recognizer 110 may return a full transcription of the speech input to the user device 104 at once, e.g., such that the transcription "Italian Ristorante" is transmitted to the user device 104 after processing the entire speech input.

In some implementations, each time the language model biasing engine 120 biases an original general language model 130, it performs the biasing on an original, unbiased general language model 130. In such instances, the language model biasing engine 120 may bias an original general language model 130 and provide the biased version of the general language model 130 to the speech recognizer 110. When the language model biasing engine 120 is called on to perform biasing again, the language model biasing engine 120 may discard the earlier biasing of the general language model 130, and may again bias the original language model 130, such that each biasing of the general language model 130 does not account for earlier biasing of the general language model 130.

In other implementations, the language model biasing engine 120 biases the general language model 130 by updating an earlier-biased version of the general language model 130. For example, after the speech recognizer 110 uses a biased version of the general language model 130 to perform speech recognition, the language model biasing engine 120 may perform subsequent biasing of the general language model 130 by further biasing the biased version of the general language model 130.

In some implementations, the n-gram cache 140 includes a hash map of n-grams. In those implementations, comparing speech recognition candidates to n-grams included in the n-gram cache 140, or identifying n-grams in the n-gram cache 140 in the general language model 130 may involve computing hashes of n-grams and comparing the hashes. For example, to perform initial biasing of the general language model 130 before a speech input is received, the language model biasing engine 120 may compare hashes of n-grams in the n-gram cache 140 to hashes of n-grams in the general language model 130. Once speech input is received, hashes of speech recognition candidates may be computed and compared with the hashes of n-grams in the n-gram cache 140 to determine whether any of the speech recognition candidates are n-grams included in the n-gram cache 140.

Figure 2:
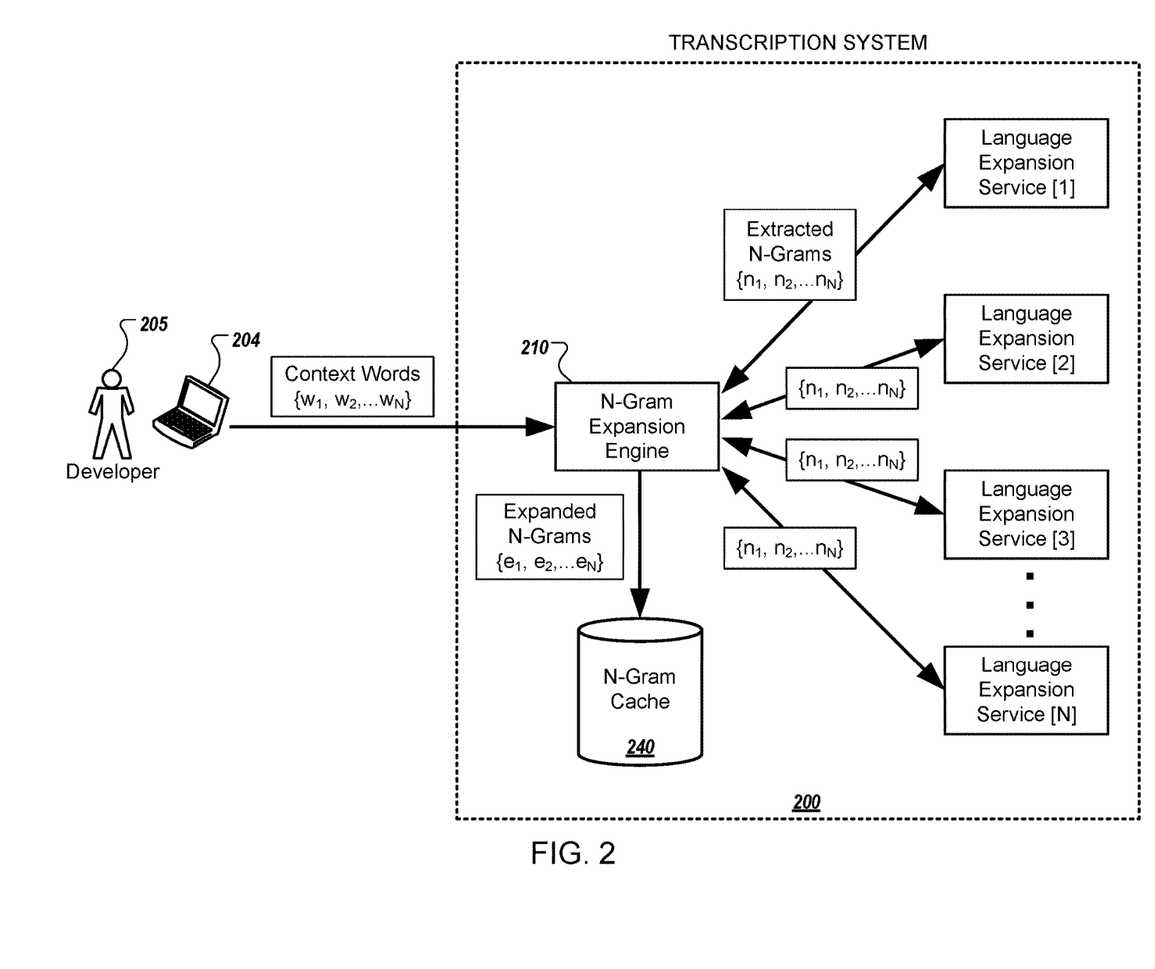
FIG. 2 depicts an example system for determining n-grams used in biasing a language model used in performing speech recognition.

FIG. 2 depicts an example system for biasing a language model used in performing speech recognition. Generally, the system of FIG. 2 may be used to expand an initial set of n-grams, and to store the expanded set of n-grams at an n-gram cache. The n-grams stored at the n-gram cache may be accessed by a language model biasing engine when biasing a general language model. For example, the language model biasing engine 120 of FIG. 1 may access the n-gram cache when biasing the general language model 130 of FIG. 1. The n-gram cache may also be accessed once speech recognition candidates for a speech input are determined by a speech recognizer using a biased general language model. For example, the speech recognizer 110 or language model biasing engine 120 may access the n-gram cache, compare n-grams of speech recognition candidates to n-grams in the n-gram cache, and based on n-grams of the speech recognition candidates matching n-grams in the n-gram cache, adjust probabilities, probability masses, or recognition scores assigned to those speech recognition candidates.

Briefly, the system shown in FIG. 2 includes a user device 204 associated with a user 205. The user device 204 may be similar to the user device 104 of FIG. 1, and be in communication with a transcription system 200 over one or more wired or wireless data pathways, e.g., over one or more networks.

The transcription system 200 includes an n-gram expansion engine 210 that is in communication with an n-gram cache 240, which in some implementations may be the same as the n-gram cache 140 of the transcription system 100. The n-gram expansion engine 210 may also be in communication with one or more language expansion services [1]-[N]. While shown in FIG. 2 as being included in the transcription system 200, in some implementations, the language expansion services [1]-[N] may be external to the transcription system 200. For example, the language expansion services [1]-[N] may be accessible by the transcription system 200 over one or more wired or wireless networks, or may be otherwise accessible to the transcription system 200.

The user 205 of the user device 204, such as a developer of a software application that is configured to respond to speech inputs, can submit context information to the transcription system 200. For example, the user 205 may desire to bias a general language model toward certain words that are relevant to the application they are developing. Such words may include those appearing in menus of the application or other words that a user of the application is likely to say, e.g., words corresponding to objects displayed to the user during use of the application. The user 205 may generate a set of these words, and the set of words may be submitted from the user device 205 to the transcription system 200 as context information.

The transcription system 200 may receive the context information, and based on the context information may determine an initial set of n-gram and an expanded set of n-grams. The transcription system 200 may store the initial set of n-grams and/or the expanded set of n-grams in the n-gram cache 240. To do so, in some implementations, the n-gram expansion engine 210 receives the context information, for example, from the user device 205 over one or more networks. The n-gram expansion engine 210 may extract an initial set of n-grams from the context information, and use the initial set of n-grams to obtain an expanded set of n-grams.

In some implementations, the n-gram expansion engine 210 can extract the initial set of n-grams from the context information received from the user device 204. For example, if the context information received from the user device 204 is a listing of words, the n-gram expansion engine 210 may extract these words as n-grams to include in the initial set of n-grams. The n-gram expansion engine 210 may also determine additional n-grams to include in the initial set of n-grams by reducing compound words from the context information into their constituent parts, or by combining words from the context information to form larger n-grams. For example, the word "eastbound" may be reduced to the single n-grams "east" and "bound," while the words "drive" and "in" may be combined to form the n-gram "drive-in." The n-gram expansion engine 210 can include all of these n-grams in the initial set of n-grams.

The n-gram expansion engine 210 can submit one or more n-grams from the initial set of n-grams to each of one or more language expansion services [1]-[N]. Each language expansion service may receive the n-grams submitted to it, process the received n-grams, and return one or more additional n-grams to the n-gram expansion engine 210. The n-gram expansion engine 210 can compile the additional n-grams to generate the expanded set of n-grams. Each of the language expansion services [1]-[N] may be specific to certain types of language expansion, and may return n-grams that are identified using the specific type of language expansion employed by that language expansion service [1]-[N].

In some implementations, the language expansion services [1]-[N] may include a synonym language expansion service. The synonym language expansion service may identify n-grams that are synonyms of the n-grams received from the n-gram expansion engine 210. For example, the synonym language expansion service may identify the n-gram "pizzeria" as a synonym of the n-gram "ristorante" submitted by the user 205. Similarly, an antonym language expansion service, homonym language expansion service, or acronym language expansion service might each generate one or more n-grams that are antonyms, homonyms, acronyms, or full forms of acronyms, respectively, for n-grams received from the n-gram expansion engine 210.

In some implementations, the language expansion services [1]-[N] may include a similar search results language expansion service. The similar search results language expansion service may identify n-grams that, when provided as the query of a search, e.g., an Internet search, yield similar search results as other n-grams. For example, the n-gram expansion engine 210 may provide the n-gram "Monticello" to the similar search results language expansion service, and the service may determine that the n-gram "Monte Cello" returns similar search results as "Monticello" based on users frequently misspelling the term in search queries. The similar search results language expansion service may therefore provide the n-gram "Monte Cello" to the n-gram expansion engine 210 for inclusion in the expanded set of n-grams.

In some implementations, the language expansion services [1]-[N] include an ontology language expansion service that identifies n-grams that are in a same category, ontology, or are otherwise identified as being related or relevant to other n-grams. For example, in response to receiving the n-gram "Italian," the ontology language expansion service may access one or more ontologies that include the n-gram "Italian" to identify additional n-grams. For example, the ontology language expansion service might identify the n-grams "Tuscan," "Roman," and "Venetian" from a first ontology, e.g., related to Italian styles or descriptions, and identify the n-grams "French," "Castilian," and "Romanian" in a second ontology, e.g., related to romance languages or languages generally.

Similarly, the language expansion services [1]-[N] can include a similar topic language expansion service. The similar topic language expansion service may identify n-grams that are identified as being related to the same topic as a particular n-gram. For example, the n-gram expansion engine 210 can submit the n-gram "vacation in Italy" to the similar topic language expansion service, and in response the similar topic language expansion service can identify n-grams such as "Venice," "pizza," "flights," "vineyards," etc., that are identified as being related to the same topic, e.g., Italy travel. A geolocation language expansion service may similarly identify n-grams that are identified as being related to a particular n-gram based on their geographical proximity. For example, the geolocation language expansion service may identify the n-grams "Colosseum," "Tiber," or "Vatican" in response to receiving the n-gram "Rome."

In some implementations, the language expansion services [1]-[N] may include a word clustering language expansion service that identifies n-grams that are close to n-grams received from the n-gram expansion engine 210 in an n-dimensional word space. For example, the word clustering language expansion service may have access to a mapping of n-grams within an n-dimensional word space. For a particular n-gram, the word clustering language expansion service may locate the particular n-gram in the n-dimensional word space, and identify other n-grams that are within a threshold distance of the particular n-gram in the word space.

The language expansion services [1]-[N] may further include an inflected languages expansion service that creates inflected forms of n-grams specified by the n-gram expansion engine 210, and returns the inflected forms of the n-grams to the n-gram expansion engine 210. The n-gram expansion engine 210 can include the inflected forms of the n-grams of the initial set of n-grams in the expanded set of n-grams.

The n-gram expansion engine 210 receives the n-grams determined by each of the language expansion services [1]-[N], and compiles the n-grams to generate the expanded set of n-grams. For example, the n-gram expansion engine 210 can receive one or more n-grams from each of the language expansion services [1]-[N], and may compile the received n-grams into the expanded set of n-grams by removing n-grams received from multiple services, n-grams that are too long or short to be useful for language model biasing, etc. In some implementations, the n-gram expansion engine 210 includes the initial set of n-grams in the expanded set of n-grams to generate a single set of n-grams that can be provided to the n-gram cache 240. In some implementations, the n-gram expansion engine 210 does not compile the received n-grams into a single set, but rather sends or forwards n-grams received from the language expansion services [1]-[N] to the n-gram cache 140 individually or as they are received from the services.

The n-gram expansion engine 210 sends the expanded set of n-grams, or information identifying the n-grams of the expanded set, to the n-gram cache 240. The n-gram cache 240 can store the n-grams or information identifying the n-grams. The n-gram cache 240 may thereafter be accessed, for example, by a language model biasing engine, e.g., the language model biasing engine 120 of FIG. 1, to identify specific speech recognition candidates that include n-grams appearing in the n-gram cache 240, or to bias a general language model used in speech recognition.

Figure 3:
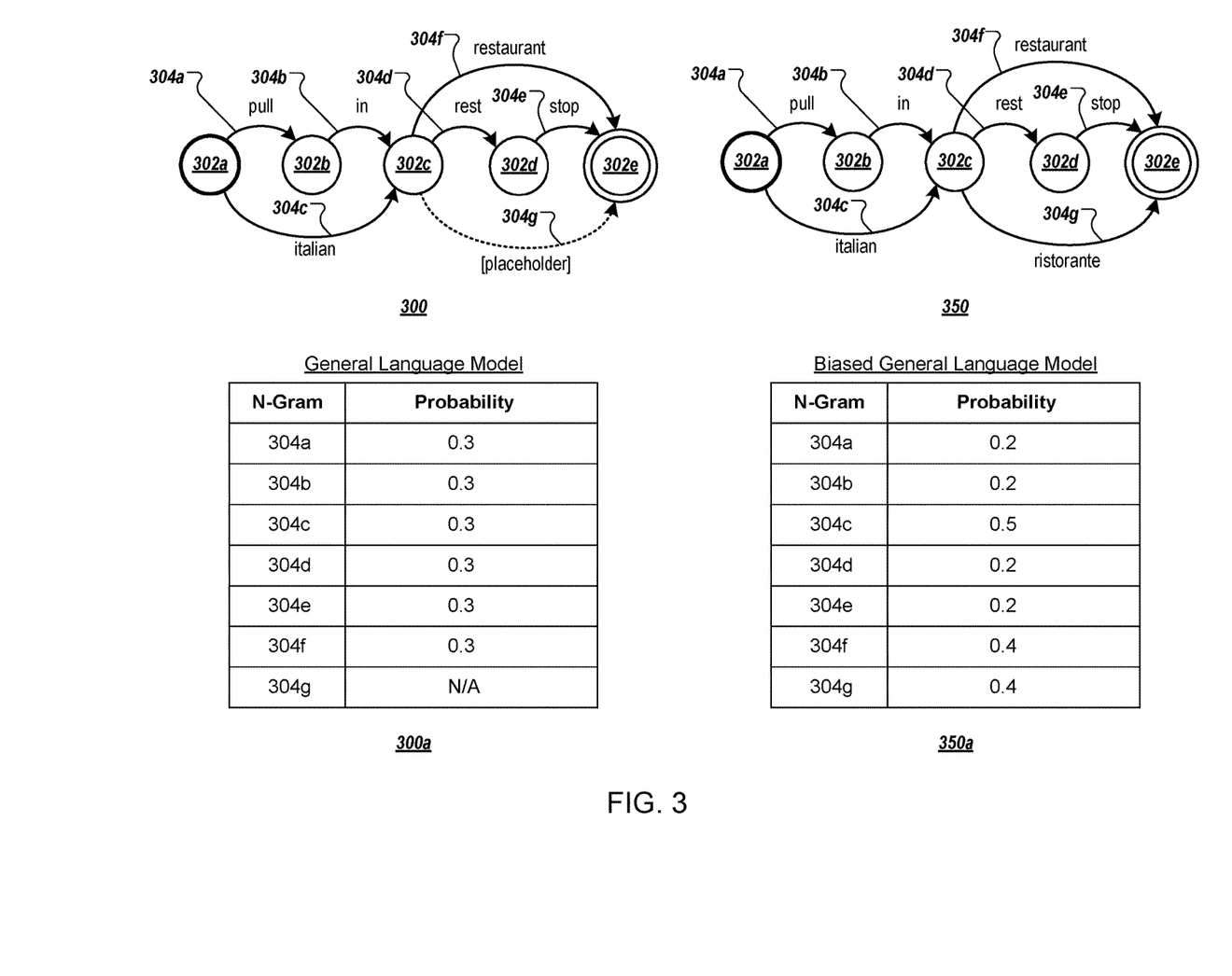
FIG. 3 depicts an example of performing language model biasing.

FIG. 3 depicts an example of performing language model biasing. For example, FIG. 3 may be a representation of biasing a general language model 300 to generate a biased version 350 of the general language model 300. The biased version 350 of the general language model 300 may be obtained, for example, after receiving the context information and before the speech input "Italian Ristorante" is provided by a user, e.g., the user 105 of the user device 104. Biasing may also occur as the speech input is processed. For example, the general language model 300 may be biased a first time before receiving the speech input "Italian Ristorante," and may be biased a second time after processing the word "Italian" in the speech input.

Briefly, the general language model 300 includes nodes corresponding to transitions between n-grams or words, and edges corresponding to n-grams or words. Some of the edges may be placeholder transitions that are not initially assigned specific n-grams or words. These placeholder transitions may have n-grams or words assigned to them during the biasing process, for example, to adjust the general language model 300 to include out-of-vocabulary words or other unusual n-grams. These placeholder transitions might not be given probabilities, probability masses, or recognition scores until they are assigned n-grams or words, or may be given probabilities, scores, or probability masses of zero until assigned. As a result, unassigned placeholder transitions are not selected as candidate transcriptions. Placeholder edges can be added or altered for each word decision, to dynamically add potential new words that may be identified as candidates.

Before receiving a speech input, or after receiving the speech input and at each word decision (e.g., word boundary), n-grams or words may be assigned to one or more of the placeholder transitions. In general, words from the cache or expanded n-gram set are assigned to the placeholder edges only when the word is not already present in the model as a potential choice for the next word. Probabilities, recognition scores, or probability masses for those placeholder edges and other edges in the general language model 300 can be adjusted to generate the biased version 350. The probability score assigned for a populated placeholder may be based on frequency of use data or may be a predetermined or dynamically set base score. The biased version 350 can be used to generate speech recognition candidates for a speech input or for a portion of the speech input, e.g., the next word in the speech input. Because the placeholder transitions are dynamically populated with words from the expanded set of n-grams, the system adds additional word options that did not exist in the model previously. Also, because the populated words are derived from the current context of the user device (e.g., are taken from the cached n-grams or expanded set), the populated words are likely to be highly relevant to the current tasks and topics of the software running on the user device.

In some implementations, each initial word from the cache can be populated into a separate placeholder edge for each word decision. For example, if the cache includes 10 n-grams, then the first word of each of the 10 n-grams can be populated as a potential next word. After that word decision is made, the same 10 words can be populated as potential words for the next decision, and so on. Of course, as the cache changes, the set of words that are populated into the placeholders may change accordingly.

In some implementations, any word in the cache may be populated into a placeholder as a potential next word. For example, 10 n-grams may be in the cache, but since some of the n-grams may include 2, 3, or more words, there may be a total of 75 different words in the cache. As a result, the system may populate each of the 75 words into placeholders as potential next words, regardless of the position of the words within the n-grams. These 75 words, or whichever words are in the cache, may be used for multiple word decisions, being populated into placeholder edges for each decision.

In some implementations, words in the n-gram cache are selectively populated into the placeholder based on the identified similarities with one or more candidates or recognized words of the user's utterance. For example, rather than add every word or each initial word from the cache as a potential next word, the system may identify a subset that fits a language pattern identified in the utterance. For example, one of the speech recognition candidates for a portion of the utterance may be the word "Italian." The system may determine whether the cache includes this word, and if so, what are the following words in the n-grams in the cache. For example, the n-gram cache may be determined to include "Italian music," "eat Italian food," and "Italian style," while other n-grams in the cache do not include the word "Italian." From the analysis, the system may extract "music," "food," and "style" as potential next words to populate into the placeholder edges, because these represent words that immediately follow "Italian" in the n-grams in the cache. Thus, a specific set of words determined to be relevant can be populated into the placeholders, without including other words from the cache.

In some implementations, an entire n-gram of multiple words, or a multiple word phrase within an n-gram, can be populated into a placeholder edge. For example, if an n-gram "Italian music" occurs in the cache, that entire n-gram may be populated into a placeholder as a potential next phrase.

As noted above, populating words or n-grams into placeholder transition edges may be accompanied with assigning a non-zero probability score for each populated edge. The system will use this language model score, as well as an acoustic model score indicating how well the word matches the sounds of the portion of the utterance being assessed, to select a set of candidate words for the word decision. In addition, preferences for certain speech recognition candidates can be adjusted based on their including certain n-grams or words, e.g., n-grams included in an n-gram cache. For example, if one of the candidates matches a word in the n-gram cache, whether the candidate was determined from a placeholder edge or was a standard feature of the language model, a likelihood score for the candidate can be boosted in response to identifying the match to a word or n-gram in the n-gram cache.

This assignment of words or n-grams to placeholder edges can be temporary, for example, only the decision about a particular word of an utterance. After candidates for the word are determined, or a decision for the word has been made, the placeholder assignments are removed and the scores for the placeholders are set to zero. In this manner, each word decision can be made with its own set of placeholder assignments, and those assignments may not affect other word decisions in the utterance, other utterances, or the recognition for utterances of other users.

As shown in FIG. 3, the general language model 300 includes the nodes 302a-302e, connected by edges 304a-304g. The edges 304a-304g correspond to n-grams in the general language model 300, with each edge 304a-304g being assigned a specific probability as shown in the chart 300a. While shown as probabilities in the chart 300a, in other implementations, the edges 304a-304g may be associated with recognition scores or probability weights, as discussed above. The language model 300 may include additional nodes and edges not shown in FIG. 3.

In the general language model, the edge 304a corresponds to the n-gram "pull" having an associated probability of 0.3. The edge 304b corresponds to the n-gram "in" having an associated probability of 0.3. The edge 304c corresponds to the n-gram "Italian" having the associated probability 0.3. The edge 304d is associated with the n-gram "rest" and the edge 304e with the n-gram "stop," each of which are associated with the probability 0.3. The edge 304f is associated with the n-gram "restaurant" having the assigned probability 0.3.

The edge 304g is a placeholder edge that may be replaced by a new n-gram, e.g., an n-gram to be added to the general language model 300. In the general language model 300 of FIG. 3, the placeholder edge 304g is not assigned a probability, however, in other applications, the placeholder edge 304g may be assigned a probability of zero, or an otherwise low probability until a specific n-gram is assigned to the placeholder edge 304g and assigned a different probability. The placeholder 304g enables biasing of the general language model 300 to include adding new n-grams to the general language model 300.

Biasing the general language model 300 creates the biased version 350 of the general language model 300. For example, based on receiving and/or determining the initial set of n-grams and the expanded set of n-grams, the language model biasing engine 120 of FIG. 1 may bias the general language model 300 to obtain the biased version 350 of the general language model 300. For instance, the language model biasing engine 120 may identify the n-grams "Italian" and "Ristorante" in the n-gram cache 140, and in response may update the general language model 300 to obtain the biased version 350. The speech recognizer 110 of FIG. 1 may use the biased version 350 of the general language model 300 to perform speech recognition on a speech input.

In the biased version 350 of the general language model 300, probabilities of the edges 304a-304g corresponding to n-grams of the general language model 300 have been updated. Additionally, the placeholder edge 304g has been assigned the n-gram "ristorante" and assigned a non-zero probability. As shown in the chart 350a, the probabilities of edges 304a and 304b have been reduced to 0.2, and the probability of the edge 304c for the n-gram "Italian" has been increased to 0.5, for example, based on the language model biasing engine 120 identifying the n-gram "Italian" in the n-gram cache 140 before receiving the audio data corresponding to the speech input.

The edges 304d and 304e have also had their probabilities reduced to 0.2, e.g., based on neither "rest" nor "stop" being identified in the n-gram cache 140. The edge 304f for the n-gram "restaurant" has been increased based on it being identified in the n-gram cache 140.

Additionally, based on this determination, the language model biasing engine 140 may add the n-gram "ristorante" to the general language model 300 by assigning the n-gram to the placeholder edge 304g and assigning the edge 304g a probability of 0.4. After biasing the general language model 300 to obtain the biased version 350, the transcription system 100 may use the biased version 350 to generate a transcription of the speech input. For example, the transcription system 100 may generate the transcription "Italian Ristorante" based on using the biased version 350 of the language model 300 to process the speech input. To do so, the speech recognizer 110 may generate candidate transcriptions for the speech input using the biased version 350 of the general language model 300. The speech recognizer 110 or language model biasing engine 120 may compare n-grams of the speech recognition candidates to the n-grams in the n-gram cache 140. The speech recognizer 110 or language model biasing engine 120 may adjust probabilities, recognition scores, or probability masses, for certain speech recognition candidates based on their inclusion in the n-gram cache 140, and may select a particular speech recognition candidate for output based on the adjusted probabilities, recognition scores, or probability masses.

Figure 4:
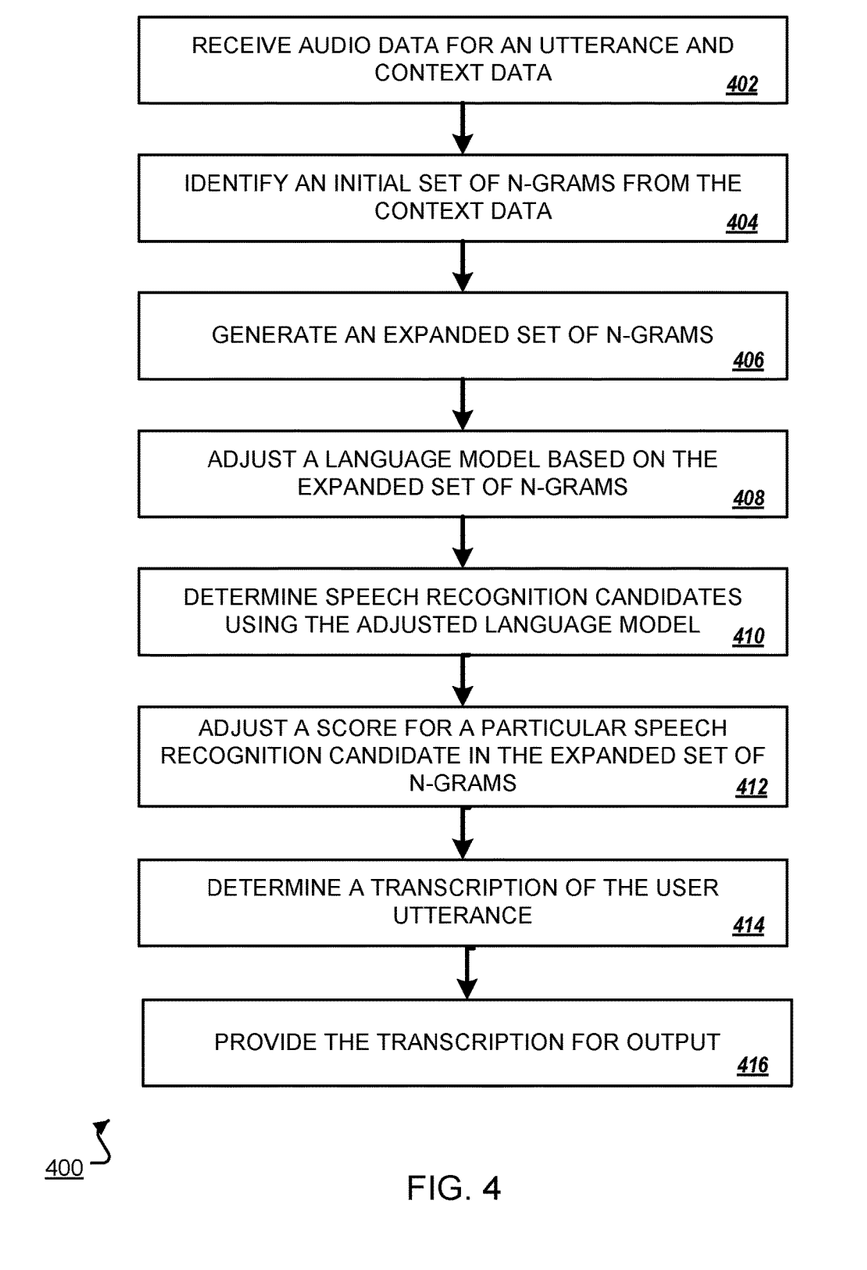
FIG. 4 is a flowchart of an example process for biasing a speech recognizer and performing speech recognition using the biased speech recognizer.

FIG. 4 is a flowchart of an example process 400 for biasing a language model and performing speech recognition using the biased version of the language model. In some implementations, the transcription system 100 of FIG. 1 and/or the transcription system 200 of FIG. 2 may perform the process 400, or portions of the process 400.

The system receives audio data that corresponds to a user utterance and context data for the user utterance (402). For example, the system may receive context information specifying one or more words from the user device 204 of the user 205, e.g., a developer. The context information may be received by, for example, the n-gram expansion engine 210. The system may also receive audio data corresponding to a speech input of a user, for example, a speech input provided by the user 105 to the user device 104. The audio data that corresponds to the speech input may be received by, for example, the speech recognizer 110 of the transcription system 100.

The system identifies an initial set of one or more n-grams from the context data (404). For example, the n-gram expansion engine 210 can receive the context data submitted by the user 205 that includes one or more words, and the n-gram expansion engine 210 can extract from those words an initial set of n-grams.

The system generates an expanded set of one or more n-grams based at least on the initial set of n-grams, the expanded set of n-grams comprising one or more n-grams that are different from the n-grams in the initial set of n-grams (406). For example, the n-gram expansion engine 210 can submit one or more of the n-grams in the initial set of n-grams to each of one or more language expansion services [1]-[N]. The language expansion services [1]-[N] can receive the n-grams and can generate one or more n-grams based on the initial set. As described, the language expansion services [1]-[N] can include, for example, a synonym language expansion service, a similar search results language expansion service, an ontology language expansion service, a word clustering language expansion service, an inflected languages expansion service, a similar topic language expansion service, etc. Each of the language expansion services [1]-[N] can generate one or more n-grams based on the n-grams from the initial set. The language expansion services [1]-[N] can provide the generated n-grams to the n-gram expansion engine 210, which can compile the n-grams to generate an expanded set of n-grams. The expanded set of n-grams would include at least one n-gram that is different from the n-grams in the initial set of n-grams. The n-grams expansion engine 210 can store the expanded set of n-grams in the n-gram cache 240.

The system adjusts a language model based at least on the expanded set of n-grams (408). For example, the language model biasing engine 120 may locate a particular n-gram corresponding to an n-gram of the expanded set of n-grams in the general language model 130 or a biased version of the general language model 130. The language model biasing engine 120 may adjust the probability, recognition score, or probability mass assigned to the particular n-gram in the general language model 130 or biased version of the general language model 130. In some implementations, the system may also adjust the language model based on the initial set of n-grams, for example, by adjusting the probabilities, recognition scores, or probability masses assigned to one or more of the n-grams of the initial set in the general language model 130 or biased version of the general language model 130.

The system determines one or more speech recognition candidates for at least a portion of the user utterance using the adjusted language model, wherein each speech recognition candidate comprises one or more words (410). For example, the speech recognizer 110 that receives the audio data corresponding to the speech input of the user 105 can perform speech recognition on the audio data or on a segment, e.g., a single frame, of the audio data to generate one or more speech recognition candidates for the audio data or segment of the audio data. The speech recognizer 110 can generate the speech recognition candidates using the biased version of the general language model 130. For example, the speech recognizer 110 may generate the speech recognition candidates using a biased version of the general language model 130 that was created before the audio data corresponding to the audio data was received. The biased version of the general language model 130 may be an original general language model 130 that has been biased based on the n-grams in the expanded sets of n-grams, and optionally, the initial set of n-grams. Alternatively, the biased version of the general language model 130 may be a version of the general language model 130 biased during an earlier speech recognition process, e.g., of an earlier segment of the audio data corresponding to the speech input of the user 105 or another speech input, and further biased based on the identified n-grams in the expanded set of n-grams.

After determining the one or more speech recognition candidates, the system adjusts a score for a particular speech recognition candidate determined to be included in the expanded set of n-grams (412). For example, the expanded set of n-grams may be stored in the n-gram cache 140 that is accessible by the language model biasing engine 120. The language model biasing engine 120 can receive the speech recognition candidates from the speech recognizer 110, and can determine that a particular one of the speech recognition candidates is included in the expanded set of n-grams by comparing the particular speech recognition candidate to the n-grams stored at the n-gram cache 140. For example, the n-gram cache 140 can include a hash map of the n-grams in the expanded set of n-grams. The language model biasing engine 120 can compare hashes corresponding to the speech recognition candidates to the hashes in the hash map to determine that a particular speech recognition candidate is included in the expanded set of n-grams. The speech recognizer 110 or language model biasing engine 120 may adjust a score for the particular speech recognition candidate by adjusting a probability, probability mass, or recognition score assigned to the particular speech recognition candidate.

After adjusting the score for the particular speech recognition candidate, the system determines a transcription for the user utterance that includes at least one of the one or more speech recognition candidates (414). For example, after the speech recognizer 110 or language model biasing engine 120 has adjusted the score for the particular speech recognition candidate, the speech recognizer 110 or language model biasing engine 120 can select a particular speech recognition from among the one or more speech recognition candidates, e.g., by selecting the speech recognition candidate with the highest probability, probability mass, or recognition score. Because the score of the particular speech recognition candidate has been adjusted based on it being included in the expanded set of n-grams, the system may be more likely to determine a transcription for the user utterance that includes the particular speech recognition candidate.

The system provides the transcription of the user utterance for output (418). For example, the speech recognizer 110 can provide the transcription of the speech input for output to the user device 104. The user device 104 may receive the transcription and may perform operations on the transcription or provide the transcription for display at an interface of the user device 104. For example, the user device 104 or an application operating on the user device 104 may process the transcription as a voice command to perform one or more operations, or the user device 104 or an application operating thereon may provide the transcription for output at an interface of the user device 104.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

For instances in which the systems and/or methods discussed here may collect personal information about users, or may make use of personal information, the users may be provided with an opportunity to control whether programs or features collect personal information, e.g., information about a user's social network, social actions or activities, profession, preferences, or current location, or to control whether and/or how the system and/or methods can perform operations more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained, such as to a city, ZIP code, or state level, so that a particular location of a user cannot be determined. Thus, the user may have control over how information is collected about him or her and used.

While the foregoing embodiments have been predominantly described with reference to the development or processing of speech inputs for use with applications installed on user devices, the described features may also be used with respect to machines, other devices, robots, or other systems. For example, the described systems and methods may be used to improve user interactions with machinery, where the machinery has an associated computing system, may be used to develop and implement voice actions for interacting with a robot or system having robotic components, may be used to develop and implement voice actions for interacting with appliances, entertainment systems, or other devices, or may be used to develop and implement voice actions for interacting with a vehicle or other transportation system.

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments have been described. Other embodiments are within the scope of the following claims. For example, the actions recited in the claims may be performed in a different order and still achieve desirable results.

What is claimed is:

1. A computer-implemented method comprising:
   receiving audio data corresponding to a user utterance and context data for the user utterance;
   identifying, based on the context data, an initial set of one or more n-grams including one or more n-grams that do not represent speech preceding the user utterance;
   generating an expanded set of one or more n-grams based at least on the initial set of n-grams, the expanded set of n-grams comprising one or more n-grams that are different from the n-grams in the initial set of n-grams;
   based at least on the expanded set of n-grams, adjusting a language model trained to predict a first set of n-grams to be able to predict an additional n-gram in the expanded set of n-grams;
   determining one or more speech recognition candidates for at least a portion of the user utterance using the adjusted language model, wherein each speech recognition candidate comprises one or more words;
   after determining the one or more speech recognition candidates, adjusting a score for a particular speech recognition candidate based on determining that the particular speech recognition candidate is included in the expanded set of n-grams;
   after adjusting the score for the particular speech recognition candidate, determining, a transcription for the user utterance that includes at least one of the one or more speech recognition candidates; and
   providing the transcription of the user utterance for output.

2. The computer-implemented method of claim 1, wherein adjusting the language model based at least on the expanded set of n-grams comprises adjusting recognition scores for one or more of the n-grams of the expanded set of n-grams in the language model.

3. The computer-implemented method of claim 1, wherein adjusting the language model based at least on the expanded set of n-grams comprises adjusting probability masses assigned to one or more n-grams of the expanded set of n-grams in the language model.

4. The computer-implemented method of claim 1, wherein the language model includes one or more placeholder transitions, and wherein adding the one or more n-grams of the expanded set of n-grams to the language model comprises:
   assigning a particular n-gram of the expanded set of n-grams to a particular placeholder transition.

5. The computer-implemented method of claim 4, wherein assigning the particular n-gram of the expanded set of n-grams to the particular placeholder transition comprises:
   adjusting a recognition score for the particular placeholder transition that is assigned the particular n-gram of the expanded set of n-grams.

6. The computer-implemented method of claim 1, wherein generating the expanded set of n-grams based at least on the initial set of n-grams comprises:
   sending one or more of the initial set of n-grams to each of one or more language expansion services; and
   receiving, from the one or more language expansion services and in response to sending the one or more of the initial set of n-grams to each of the one or more language expansion services, the expanded set of one or more n-grams.

7. The computer-implemented method of claim 1, wherein one or more of the expanded set of n-grams are included in a hash map, and wherein adjusting the score for the particular speech recognition candidate determined to be included in the expanded set of n-grams comprises:
   determining that the particular speech recognition candidate is included in the hash map.

8. The computer-implemented method of claim 1, wherein the audio data corresponding to the user utterance corresponds to a particular segment of a spoken user input that comprises multiple segments; and
   wherein the language model is a general language model or a general language model that has been influenced during processing of a segment preceding the particular segment of the spoken user input.

9. The computer-implemented method of claim 1, wherein the context data does not include one or more words included in a previous transcription of a user utterance.

10. The computer-implemented method of claim 1, wherein the language model is adjusted based at least on the expanded set of n-grams prior to receiving the audio data corresponding to the user utterance.

11. The computer-implemented method of claim 1, wherein adjusting the language model is performed in response to receiving the context data for the user utterance, the context data indicating a context at a time the user utterance is spoken.

12. The method of claim 1, wherein receiving the audio data comprises receiving audio data detected by a user device; and wherein the initial set of n-grams comprises one or more words or phrases displayed on a screen of the user device.

13. The method of claim 1, wherein receiving the audio data comprises receiving audio data detected by a user device; and wherein one or more of the initial set of n-grams are provided by an application running on the user device.

14. The method of claim 1, wherein receiving the audio data comprises receiving audio data detected by a user device; and wherein the initial set of n-grams include a predetermined set of terms corresponding to a current dialog state corresponding one of multiple steps for carrying out a task.

15. The method of claim 1, wherein the context data includes an application identifier or a dialog state identifier; wherein the method comprises:

retrieving a set of terms based on the application identifier or dialog state identifier; and including the retrieved set of terms in the expanded set of one or more terms.

16. The method of claim 1, wherein receiving the context data comprises receiving context data indicating a current context of a user device when the user device generates the audio data for the user utterance.

17. A system comprising:

one or more computers and one or more storage devices storing instructions that are operable, when executed by the one or more computers, to cause the one or more computers to perform operations comprising:

receiving audio data corresponding to a user utterance and context data for the user utterance;

identifying, based on the context data, an initial set of one or more n-grams including one or more n-grams that do not represent speech preceding the user utterance;

generating an expanded set of one or more n-grams based at least on the initial set of n-grams, the expanded set of n-grams comprising one or more n-grams that are different from the n-grams in the initial set of n-grams;

based at least on the expanded set of n-grams, adjusting a language model trained to predict a first set of n-grams to be able to predict an additional n-gram in the expanded set of n-grams;

determining one or more speech recognition candidates for at least a portion of the user utterance using the adjusted language model, wherein each speech recognition candidate comprises one or more words;

after determining the one or more speech recognition candidates, adjusting a score for a particular speech recognition candidate based on determining that the particular speech recognition candidate is included in the expanded set of n-grams;

after adjusting the score for the particular speech recognition candidate, determining, a transcription for the user utterance that includes at least one of the one or more speech recognition candidates; and providing the transcription of the user utterance for output.

18. The system of claim 17, wherein adjusting the language model based at least on the expanded set of n-grams comprises adjusting the language model to generate scores for candidate transcriptions using adjusted probability scores different from probability scores determined through training of the language model, the adjusted probability scores indicating increased probabilities for one or more of the n-grams of the expanded set of n-grams compared to the probability scores determined through training of the language model.

19. The system of claim 17, wherein the language model includes one or more placeholder transitions, and wherein adding the one or more n-grams of the expanded set of n-grams to the language model comprises:

assigning a particular n-gram of the expanded set of n-grams to a particular placeholder transition for determining the one or more speech recognition candidates for at least a portion of the user utterance; and wherein the operations comprise:

after determining the one or more speech recognition candidates for at least a portion of the user utterance using the adjusted language model, removing the assignment of the particular n-gram to the particular placeholder transition.

20. A non-transitory computer-readable storage device storing software comprising instructions executable by one or more computers which, upon such execution, cause the one or more computers to perform operations comprising:

receiving audio data corresponding to a user utterance and context data for the user utterance;

identifying an initial set of one or more n-grams from the context data;

generating an expanded set of one or more n-grams based at least on the initial set of n-grams, the expanded set of n-grams comprising one or more n-grams that are different from the n-grams in the initial set of n-grams;

adjusting a language model based at least on the expanded set of n-grams;

determining one or more speech recognition candidates for at least a portion of the user utterance using the adjusted language model, wherein each speech recognition candidate comprises one or more words;

after determining the one or more speech recognition candidates for at least a portion of the user utterance using the adjusted language model, undoing the adjustment to the language model;

after determining the one or more speech recognition candidates, adjusting a score for a particular speech recognition candidate determined to be included in the expanded set of n-grams;

after adjusting the score for the particular speech recognition candidate, determining, a transcription for the user utterance that includes at least one of the one or more speech recognition candidates; and providing the transcription of the user utterance for output.

* * * * *